United States Patent
Chun

(10) Patent No.: US 12,459,445 B2
(45) Date of Patent: Nov. 4, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventor: Sangwoo Chun, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 227 days.

(21) Appl. No.: 18/076,139

(22) Filed: Dec. 6, 2022

(65) Prior Publication Data

US 2023/0182654 A1 Jun. 15, 2023

(30) Foreign Application Priority Data

Dec. 9, 2021 (KR) .................. 10-2021-0175514

(51) Int. Cl.
*B60R 11/04* (2006.01)
*B60S 1/08* (2006.01)

(52) U.S. Cl.
CPC ............ *B60R 11/04* (2013.01); *B60S 1/0848* (2013.01)

(58) Field of Classification Search
None
See application file for complete search history.

(56) References Cited

U.S. PATENT DOCUMENTS

| | | | | |
|---|---|---|---|---|
| 2004/0201697 A1* | 10/2004 | Klein | ................... | H04N 23/70 348/207.99 |
| 2006/0132600 A1* | 6/2006 | Chretien | ................ | G02B 13/14 348/148 |
| 2007/0073484 A1* | 3/2007 | Horibe | ................... | G08G 1/166 382/104 |
| 2008/0309517 A1* | 12/2008 | Saito | ...................... | H04N 23/70 340/937 |
| 2010/0172542 A1* | 7/2010 | Stein | .................... | G06V 20/588 348/148 |
| 2011/0073142 A1* | 3/2011 | Hattori | .................... | B60S 1/481 134/198 |
| 2011/0285848 A1* | 11/2011 | Han | ......................... | B60R 1/27 348/148 |
| 2012/0008866 A1* | 1/2012 | Halimeh | ................ | G06T 7/0002 382/190 |
| 2012/0117745 A1* | 5/2012 | Hattori | ..................... | B60S 1/54 134/198 |
| 2012/0233841 A1* | 9/2012 | Stein | .................... | G03B 17/561 396/428 |
| 2012/0294482 A1* | 11/2012 | Kasaoki | ................. | G06V 20/56 382/103 |

(Continued)

*Primary Examiner* — Mohammad J Rahman
(74) *Attorney, Agent, or Firm* — Lempia Summerfield Katz LLC

(57) ABSTRACT

A vehicle includes at least one camera configured to photograph an image around the vehicle, a memory configured to store image data input from the at least one camera, and a controller. The controller is configured to determine that a foreign material is present on the at least one camera and to output a warning message to a user when a brightness change rate of at least one pixel among each pixel of an image frame included in the image data is less than or equal to a reference value and is lower than an average brightness of other pixels except for the at least one pixel.

16 Claims, 12 Drawing Sheets

(56) References Cited

U.S. PATENT DOCUMENTS

| | | | | |
|---|---|---|---|---|
| 2013/0300869 | A1* | 11/2013 | Lu | H04N 23/811 |
| | | | | 348/148 |
| 2015/0049193 | A1* | 2/2015 | Gupta | G06T 7/85 |
| | | | | 348/148 |
| 2016/0280229 | A1* | 9/2016 | Kasahara | G06V 10/141 |
| 2017/0267178 | A1* | 9/2017 | Shiga | G06V 10/147 |
| 2018/0137375 | A1* | 5/2018 | Takemura | H04N 23/75 |
| 2018/0165529 | A1* | 6/2018 | Ishigami | G08G 1/0962 |
| 2018/0200745 | A1* | 7/2018 | Dudar | B05B 12/004 |
| 2018/0290632 | A1* | 10/2018 | Rice | B60S 1/56 |
| 2018/0293458 | A1* | 10/2018 | Makarewicz | G06T 7/11 |
| 2018/0352214 | A1* | 12/2018 | Korzec | H04N 13/282 |
| 2019/0092287 | A1* | 3/2019 | Leach | B60S 1/56 |
| 2019/0124277 | A1* | 4/2019 | Mabuchi | H04N 25/535 |
| 2020/0139936 | A1* | 5/2020 | Yamauchi | B60S 1/36 |
| 2020/0139940 | A1* | 5/2020 | Rice | B60S 1/56 |
| 2020/0218910 | A1* | 7/2020 | Herman | B60R 1/27 |
| 2020/0282921 | A1* | 9/2020 | Herman | H04N 23/72 |
| 2020/0391702 | A1* | 12/2020 | Yamauchi | B60Q 9/00 |
| 2021/0018590 | A1* | 1/2021 | Grau | B60W 50/0225 |
| 2021/0253066 | A1* | 8/2021 | Shirakura | B60S 1/485 |
| 2021/0309188 | A1* | 10/2021 | Jones | E02F 9/0858 |
| 2021/0409578 | A1* | 12/2021 | Zhu | G06T 7/0002 |
| 2022/0222528 | A1* | 7/2022 | Kapoor | G06N 3/082 |
| 2022/0406032 | A1* | 12/2022 | Sekikawa | G06V 10/98 |
| 2022/0408005 | A1* | 12/2022 | Murphy | G01S 17/931 |
| 2023/0169640 | A1* | 6/2023 | Wake | A01G 7/00 |
| | | | | 382/110 |

* cited by examiner

VEHICLE AND CONTROL METHOD THEREOF

CROSS-REFERENCE TO RELATED APPLICATION

This application claims under 35 U.S.C. § 119 the benefit of and priority to Korean Patent Application No. 10-2021-0175514, filed on Dec. 9, 2021 in the Korean Intellectual Property Office, the entire contents of which are incorporated herein by reference.

BACKGROUND

1. Technical Field

The disclosure relates to a vehicle and a control method thereof that may detect distortion of a camera image by an external contaminant and provide a driver with information about whether the contaminant is present in order to determine a reliability of the image.

2. Description of Related Art

A vehicle is equipped with a dashboard camera for monitoring the outside surroundings or with a camera for detecting a specific object or for lane-keeping.

In particular, a computer vision algorithm is used to detect or measure a specific object in an image photographed by a camera. In this case, however, the camera may fail to detect or measure an object.

Such failures are caused by an algorithm's failure due to a camera lens surface being contaminated with external contaminants such as rain, snow, dust, and the like.

SUMMARY

Accordingly, there is a need to develop technology for compensating for failures of current systems to detect or measure objects caused, for example, by the camera lens surface being contaminated.

An aspect of the disclosure provides a vehicle and a control method thereof that may detect distortion of a camera image by an external contaminant and that may provide a driver with information about whether the contaminant is present in order to determine a reliability of the image.

Additional aspects of the disclosure are set forth in part in the following description and, in part, should be obvious from the description or may be learned by practice of the disclosure.

According to an embodiment of the disclosure, a vehicle is provided. The vehicle includes: at least one camera configured to photograph an image around the vehicle; a memory configured to store image data input from the at least one camera; and a controller. The controller is configured to determine that a foreign material is present on the at least one camera and to output a warning message to a user. The controller is configured to do so when a brightness change rate of at least one pixel among each pixel of an image frame included in the image data is less than or equal to a reference value and is lower than an average brightness of other pixels except for the at least one pixel.

The controller is configured to obtain a histogram of a brightness of each of the pixels, equalize the histogram, and compare the average brightness of the other pixels with a brightness of the at least one pixel.

The controller is configured to divide the image frame into preset segments and compare the average brightness of the other pixels with a brightness of the at least one pixel for each segment.

The controller is configured to increase a length of the image data input from the at least one camera to increase a number of image frames to be sampled when a steering angle of the vehicle is less than a reference value.

The controller is configured to increase a length of the image data input from the at least one camera to increase a number of image frames to be sampled when an illuminance detected by an illuminance sensor of the vehicle is less than a reference value.

The controller is configured to increase a degree of contamination by the foreign material, with respect to a region including information for driving of the vehicle in the image photographed by the at least one camera.

When a part of the vehicle is included in the image photographed by the at least one camera, the controller is configured to stop a foreign material detection with respect to pixels corresponding to the part of the vehicle.

When a license plate of another vehicle traveling on a road is recognized in the image photographed by the at least one camera, the controller is configured to stop a foreign material detection with respect to pixels adjacent to pixels recognized as the license plate.

The controller is configured to output the warning message and operate a sensor cleaning system simultaneously when a brightness of the at least one pixel is lower than the average brightness of the other pixels by more than a reference range.

According to an embodiment of the disclosure, a control method of a vehicle is provided. The control method includes: photographing, by a camera, an image around the vehicle; storing image data input from the camera; detecting a brightness change rate of each pixel of an image frame included in the image data; determining that a foreign material is present on the camera when a brightness change rate of at least one pixel among each of the pixels is less than or equal to a reference value and is lower than an average brightness of other pixels except for the at least one pixel; and outputting a warning message to a user based on a determination that the foreign material is present.

The determining that the foreign material is present further includes obtaining a histogram of a brightness of each of the pixels, equalizing the histogram, and comparing the average brightness of the other pixels with a brightness of the at least one pixel.

The determining that the foreign material is present further includes dividing the image frame into preset segments and comparing the average brightness of the other pixels with a brightness of the at least one pixel for each segment.

The storing of the image data input from the camera increases a length of the image data input from the camera to increase a number of image frames to be sampled when a steering angle of the vehicle is less than a reference value.

The storing of the image data input from the camera increases a length of the image data input from the camera to increase a number of image frames to be sampled when an illuminance detected by an illuminance sensor of the vehicle is less than a reference value.

The detecting of the brightness change rate of each of the pixels of the image frame further includes increasing a degree of contamination by the foreign material with respect to a region including information for driving of the vehicle in the image photographed by the camera.

The determining that the foreign material is present further includes, when a part of the vehicle is included in the image photographed by the camera, stopping a foreign material detection with respect to pixels corresponding to the part of the vehicle.

The determining that the foreign material is present further includes, when a license plate of another vehicle traveling on a road is recognized in the image photographed by the camera, stopping a foreign material detection with respect to pixels adjacent to pixels recognized as the license plate.

The outputting of the warning message to the user further includes outputting the warning message and operating a sensor cleaning system simultaneously when a brightness of the at least one pixel is lower than the average brightness of the other pixels by more than a reference range.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
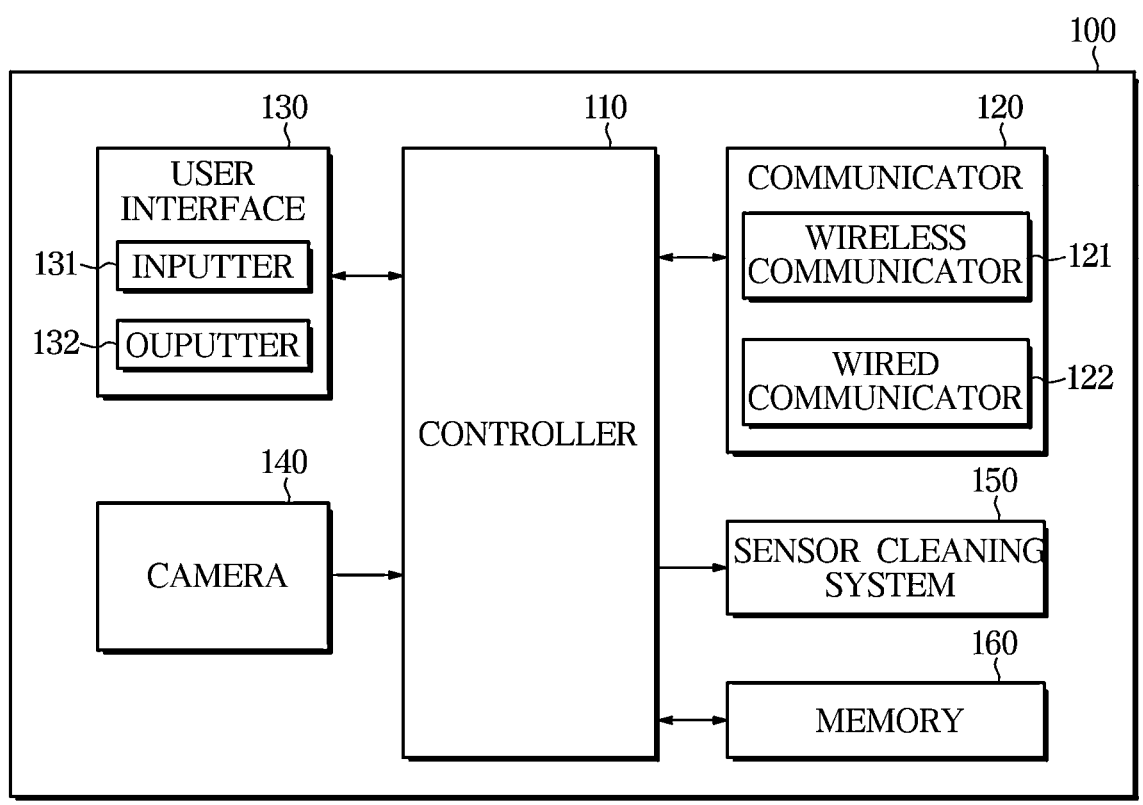
FIG. 1 is a control block diagram illustrating a vehicle according to an embodiment.

The embodiments set forth herein and illustrated in the configuration of the disclosure are only example embodiments. Thus, it should be understood that they may be replaced with various equivalents and modifications at the time of the disclosure.

Like reference numerals throughout the specification denote like elements. Also, this specification does not describe all the elements according to various embodiments of the disclosure.

Throughout the specification, it is to be understood that the singular forms are intended to include the plural forms as well, unless the context clearly dictates otherwise. It should be further understood that the terms "include", "comprise" and/or "have" when used in this specification, specify the presence of stated features, integers, stages, operations, elements, and/or components, but do not preclude the presence or addition of one or more other features, integers, stages, operations, elements, components, and/or groups thereof.

Also, the terms including ordinal numbers such as "first" and "second" may be used to explain various components. However, the components are not limited by the terms and the terms are only for the purpose of distinguishing one component from another. For example, without departing from the technical spirit or essential features of the disclosure, a first element may be referred to as a second element and a second element may be referred to as a first element. Description herein should be understood to include any and all combinations of one or more of the associated items when the items are described by using the conjunctive term "~and/or ~", or the like.

Also, terms such as "~part", "~device", "~block", "~member", "~module", and the like may refer to a unit for processing at least one function or act. For example, the terms may refer to at least process processed by at least one hardware, such as field-programmable gate array (FPGA)/ application specific integrated circuit (ASIC), software stored in a memory or a processor. Further, terms such as "surrounding", "nearby", "close", "around" and the like may refer to objects in relatively close proximity to a vehicle.

Reference numerals used for method stages are just used for convenience of explanation, but not to limit an order of the stages. Thus, unless the context clearly dictates otherwise, the written order may be practiced otherwise. Further, when a component, device, element, or the like of the present disclosure is described as having a purpose or performing an operation, function, or the like, the component, device, or element should be considered herein as being "configured to" meet that purpose or perform that operation or function.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, phrases such as "at least one of <A>, <B>, ... and <N>" or "at least one of <A>, <B>, ... <N>, or combinations thereof" should be defined in the broadest sense. Such definitions supersede any other implied definitions herebefore or hereinafter provided, unless expressly asserted herein to the contrary, to mean one or more elements selected from the group comprising A, B, ... and N, i.e., any combination of one or more of the elements A, B, ... or N including any one element alone or in combination with one or more of the other elements, which may also include, in combination, additional elements not listed.

The disclosed embodiments may be embodied in the form of a recording medium storing instructions executable by a computer. In an embodiment, the computer-readable recording medium has recorded thereon computer-executable instructions for controlling a specific function of a vehicle. The computer-readable medium may be coupled with a processor or a controller 110 configured to execute the computer-executable instructions. The instructions may be stored in the form of program code and, when executed by the processor or a controller, may generate a program module to perform the operations of the disclosed embodiments. The recording medium may be embodied as a computer-readable recording medium.

The computer-readable recording medium includes all kinds of recording media in which instructions which may be decoded by a computer are stored, for example, in read only memory (ROM), random access memory (RAM), magnetic tapes, magnetic disks, flash memory 160, optical recording medium, and the like.

Embodiments of a vehicle 100 and a control method thereof according to an aspect of the disclosure are described below in detail with reference to the accompanying drawings.

FIG. 1 is a control block diagram illustrating the vehicle 100 according to an embodiment.

Referring to FIG. 1, the vehicle 100 includes a camera 140 for photographing a front of the vehicle 100, a communicator 120 for performing wired/wireless communication with external and internal devices, a user interface 130 for displaying a warning, a non-transitory memory 160 for storing transitorily or non-transitorily information required for a vehicle-related control, and a controller 110 for controlling the above-described constituent components. In an embodiment, the non-transitory memory 160 may further store computer-executable instructions and may be coupled with a processor configured to execute the computer-executable instructions. In an embodiment, the controller 110 may be implemented by the processor.

Also, the controller 110 of the vehicle 100 may control the communicator 120 to wirelessly communicate with another vehicle or a road infrastructure through, i.e., via a Vehicle to Vehicle (V2V) or Vehicle to Infrastructure (V2I) communication.

The communicator 120 may communicate with the other vehicle or a traffic infrastructure through a wireless communication base station. The communicator 120 may include a wireless communicator 121 and a wired communicator 122.

For example, the communicator 120 may use communication methods of the second generation (2G) such as time division multiple access (TDMA), code division multiple access (CDMA), and the like, communication methods of the third generation (3G) such as a wide code division multiple access (WCDMA), code division multiple access 2000 (CDMA 2000), wireless broadband (Wibro), world interoperability for microwave access (WiMAX), and the like, and communication methods of the fourth generation (4G) such as long-term evolution (LTE), Wibro evolution, and the like. The communicator 120 may also use the fifth generation (5G) communication method.

The communicator 120 may include at least one constituent component enabling communication with an external device, such as for example, at least one of a short-range communication module, the wired communicator 122 or the wireless communicator 121.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communicator 122 may include various wired communicators such as a controller region network (CAN) communication module, local region network (LAN) module, wide region network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), and the like.

The wireless communicator 121 may include wireless communicators that support a variety of communication methods such as a radio data system-traffic message channel (RDS-TMC), digital multimedia broadcasting (DMB), Wifi module, Wibro module, as well as global system for mobile communication (GSM), CDMA, WCDMA, universal mobile telecommunications system (UMTS), TDMA, LTE, and the like.

The wireless communicator 121 may include a wireless communication interface including a receiver and an antenna for receiving a traffic information signal. Also, the wireless communicator 121 may further include a traffic information signal conversion module for demodulating an analog wireless signal, received through the wireless communication interface, into a digital control signal.

When information about roads, road signs, traffic lights, and data of the other vehicle are collected, the communicator 120 may transmit the collected data to the controller 110 or may receive a control signal that requests the other vehicle for information from the controller 110 and transmit the control signal to the other vehicle.

The user interface 130 may include the inputter 131 and the outputter 132. The inputter 131 may be implemented by a processor and may receive a command about an operation of a sensor cleaning system 150 from a user and transmit the command to the controller 110. The outputter 132 may be implemented by a processor and may display a warning message or an alarm about a sensor cleaning operation.

The user interface 130 may include an audio video navigation (AVN) display. According to an embodiment, however, the inputter 131 for receiving a user command and the outputter 132 for displaying a warning message are not limited to the AVN display.

Although the user interface 130 is not the AVN display, as long as the user may input a command through the inputter 131 and check the displayed content through the outputter 132, the types of the inputter 131 and the outputter 132 are not limited.

For example, the inputter 131 may include an automotive voice recognition system, and the outputter 132 may include a speaker that outputs a sound inside the vehicle 100. In another embodiment, the inputter 131 may include a number pad, a keyboard, or a cursor control device, such as a mouse, or a joystick, touch screen display, remote control, or any other device operative to interact with the controller 110.

When the user utters a command, the automotive voice recognition system may analyze the input command and determine a domain corresponding to the command to perform an operation.

Accordingly, when the inputter 131 is the automotive voice recognition system, the user may control the sensor cleaning system 150 of the vehicle 100 by voice or check a degree of contamination.

In addition, the inputter 131 may be used for an electronic system for controlling the vehicle 100, controlling an air conditioning system of the vehicle 100, or inputting a destination in a navigation device through voice recognition.

Also, the outputter 132 may display information indicating a state of the vehicle 100, information for guiding a setting of the vehicle 100, a navigation screen, multimedia content, or information related to driving.

At least one camera 140 may be mounted inside the vehicle 100 at a position capable of photographing surroundings of the vehicle 100.

Alternatively, a mobile device coupled with the camera 140 is connected to the vehicle 100 and may function as the camera 140 for photographing the surroundings of the vehicle 100. The mobile device and the vehicle 100 may be connected to each other by a wireless communication such as Bluetooth, or through a wired cable.

The camera 140 may be a built-in drive video record system (DVRS) inside the vehicle 100 or a dashboard camera separately mounted inside the vehicle 100, without being limited thereto.

A type of camera 140 is not limited, as long as it is an image device capable of photographing and obtaining an image of a front of the vehicle 100.

The sensor cleaning system 150 may be a system for removing contaminants to secure a stability of a sensor or the camera 140 that photographs the surroundings of the vehicle 100 or detects an external object.

The sensor cleaning system 150 may include a nozzle, a distributor, a controller, a washer motor, and an air compressor. However, the sensor cleaning system 150 is not limited thereto, as long as it may remove external contaminants from the sensor.

The sensor cleaning system 150 may include a controller. The sensor cleaning system 150 may be integrally controlled by the controller. Specifically, the controller may receive a CAN signal about an operation via CAN communication from the controller 110 according to an embodiment.

When the controller receives the CAN signal for operating the sensor cleaning system 150 from the controller 110 according to an embodiment, the controller may transmit an ON signal to a washer heater to heat a washer fluid and transmit an ON signal to a washer motor to drive the washer motor for discharging the washer fluid.

Afterwards, the controller may control a solenoid valve and the nozzle to heat the washer fluid inside the nozzle and discharge the washer fluid from the nozzle. Also, when the washer fluid is discharged, the controller may operate wipers to remove a foreign material 200 and the washer fluid.

The above-described operations of the sensor cleaning system 150 are merely examples, and may include any hardware device operable and capable of removing the foreign material 200. As another example, by including a transparent plastic cover on a surface of the camera 140, when the foreign material 200 is stuck on a surface of the camera 140, the sensor cleaning system 150 may remove the foreign material 200 by rotating the plastic cover at high speed.

In another example, the sensor cleaning system 150 may remove the foreign material 200 such as snow or ice by including a heating wire around the camera 140 to prevent the camera 140 from being covered by snow or ice in winter.

The memory 160 may be used to store images around the vehicle 100 photographed while driving, in units of frames. Also, the memory 160 may be used to store information about a speed limit of a road or information about a road signal that limits a driving route.

The memory 160 may include a volatile memory 160, such as a static random access memory (S-RAM) and a dynamic random access memory (D-RAM), and may include a non-volatile memory 160, such as a read only memory (ROM), an erasable programmable read only memory (EPROM), and the like. The memory 160 may include one memory element or a plurality of memory elements.

The controller 110 may control the communicator 120, the user interface 130, the camera 140, the sensor cleaning system 150 and the memory 160 to confirm whether the foreign material 200 is present and output a warning message.

Specifically, the controller 110 may analyze image data obtained from the camera 140 as a plurality of image frames. The controller 110 thereby may determine whether the foreign material 200 is present in front of the camera 140 based on pixel information. When it is determined that the foreign material 200 is present, the controller 110 may control the vehicle 100 depending on the degree of contamination.

Also, the controller 110 may control the communicator 120 to receive information about roads, road signs, traffic lights, and data of the other vehicle, and vary a method of detecting the foreign material 200 depending on the received data.

The controller 110 may control the user interface 130 to receive a command about an operation of the sensor cleaning system 150 from the user and display a warning message or an alarm about a sensor cleaning operation.

The controller 110 may control the camera 140 to acquire an image around the vehicle 100. In this instance, a type of camera 140 is not limited, as long as it is an image device capable of photographing and obtaining an image of a front of the vehicle 100.

The controller 110 may control the sensor cleaning system 150 to remove contaminants to secure a stability of a sensor or the camera 140 that photographs the surroundings of the vehicle 100 or detects an external object.

A control method of the controller 110 is described in detail below with reference to drawings according to various embodiments.

Figure 2:
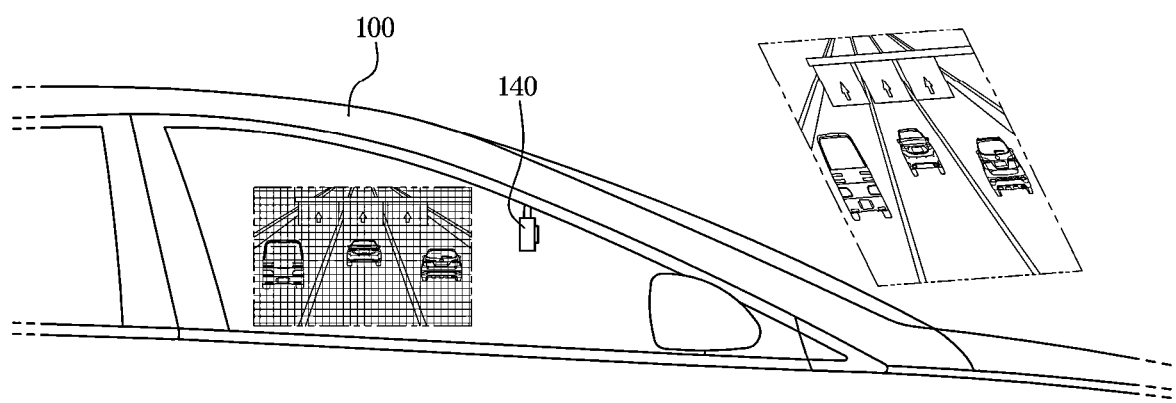
FIG. 2 is a diagram illustrating an example of normal pixels without a foreign material in a vehicle according to an embodiment.

FIG. 2 is a diagram illustrating an example of normal pixels without the foreign material 200 in the vehicle 100 according to an embodiment.

Referring to FIG. 2, the camera 140 for photographing a front of the vehicle 100 is illustrated. Further, FIG. 2 illustrates image data when no foreign material 200 is present in a front windshield of the vehicle 100.

The camera 140 for photographing the front of the vehicle 100 is described in FIG. 2 and below, but the camera 140 for photographing the front of the vehicle is only an example. Specifically, the camera 140 may include the camera 140 for photographing a rear of the vehicle 100, the camera 140 for assisting in reversing of the vehicle 100, the around-view camera 140 capable of displaying images for all angles of the vehicle 100, and the camera 140 for image-based autonomous driving that recognizes an external risk and road conditions and autonomously moves to a destination without a driver's manipulation based on images taken by the camera 140.

According to an embodiment, the camera 140 provided in the vehicle 100 may photograph images and image data may include a plurality of image frames. The image frame may be defined as a single picture, and for example, in National Television System Committee (NTSC) systems in South Korea, the United States, Japan, and the like, 30 still frames per second are included.

According to an embodiment, the camera 140 of the vehicle 100 may store each frame as a pixel. An image frame photographed by the camera 140 includes a set of pixels and the pixels may be expressed as a color or intensity of light appearing at a designated position in an image.

Storing the image frame as a set of pixels by the camera 140 may be a method of storing content of each grid like a graph paper. Information such as a color, gray level, transparency, and the like may be stored in each pixel.

A surrounding driving state of the vehicle 100 photographed by the camera 140 may be determined based on a movement of the vehicle 100 or a nearby object. Thus, the required pixel information corresponding to the movement may change based on the driving state of the vehicle 100.

Because it is illustrated in FIG. 2 that no foreign material 200 is present in the front windshield of the vehicle 100, the front image photographed by the camera 140 may be stored without distortion.

Each of the image frames of the image photographed by the camera 140 may be stored as a grid-shaped pixel. Each pixel may have a color, gray level, and transparency corresponding to the image.

Figure 3:
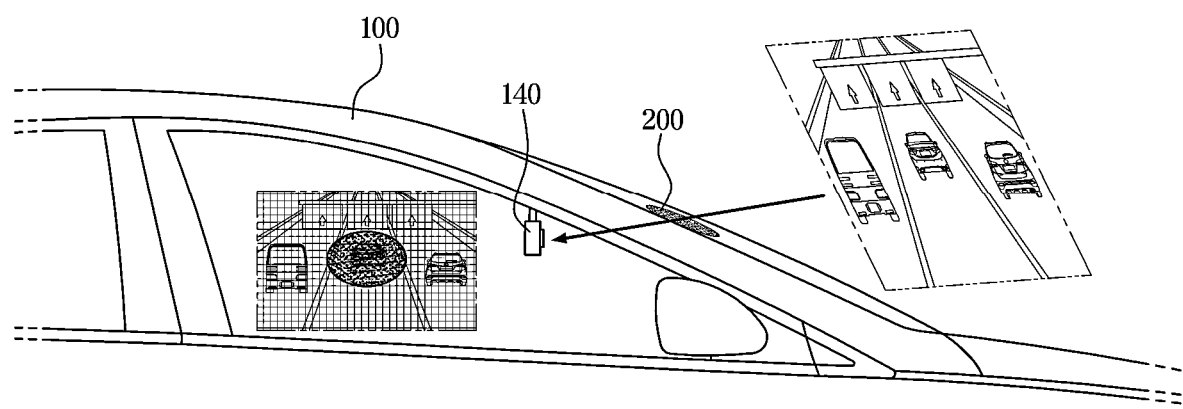
FIG. 3 is a diagram illustrating an example of abnormal pixels with a foreign material in a vehicle according to an embodiment.

FIG. 3 is a diagram illustrating an example of abnormal pixels with the foreign material 200 in the vehicle 100 according to an embodiment.

Because the camera 140 is installed on an outside surface of the vehicle 100 or at a position close to a window of the vehicle 100, dust or the foreign material 200 may be easily attached to the camera 140 or the window due to exposure to an external environment. Accordingly, the dust or the foreign material 200 may interfere with checking the external environment through a monitor by a user.

In particular, when the vehicle 100 is driven on a dirt road, the lens of the camera 140 or the window of the vehicle 100 may be contaminated by dust or dirt.

Also, when the vehicle 100 is a heavy vehicle 100 such as a bulldozer, excavator, dump truck, loader, forklift and the like, a front windshield of the vehicle 100 may be easily contaminated by dirt, dust, oil, and the like, obstructing a view of the camera 140.

A type of the foreign material 200 is not limited to dust or dirt attached to the lens of the camera 140 or the vehicle 100. Fogging or dew condensation caused by a difference between an internal temperature and an external temperature of the vehicle 100 may also be included in the foreign material 200.

Since a driver may keep his/her eyes looking forward during driving, the driver may be able to realize/notice that the foreign material 200 is attached to the front windshield of the vehicle 100. However, the foreign material 200 may be attached at a position, e.g., an upper portion of the front windshield, that may not be within the driver's normal line of sight or field of view.

When the foreign material 200 is attached to the lens of the camera 140 or the vehicle 100, an entire or a portion of the view of the camera 140 may be covered, leading to malfunctions of an advanced driver assistance system (ADAS) or failure of video recording in an event of an accident.

When the foreign material 200 is attached to a position within the driver's field of view, the driver may manually operate the sensor cleaning system 150 or remove the foreign material 200 after stopping the vehicle 100, causing an inconvenience or an accident due to a distraction of the driver's gaze when removing the foreign material 200.

When the foreign material 200 is attached to a position outside the driver's normal line of sight or field of view, the ADAS or video recording in the event of an accident may malfunction when the driver does not recognize a necessity of operating the sensor cleaning system 150.

Although the foreign material 200 may be removed for normal photographing of the camera 140, when the driver may not notice that the foreign material 200 is attached to the front windshield of the vehicle and that the foreign material 200 is not removed, malfunctions such as erroneous recognition of lanes during autonomous driving and an accident may occur.

As shown in FIG. 3, when the foreign material 200 is attached to the front windshield of the vehicle 100 and a portion of the field of view of the camera 140 is covered, pixels corresponding to, i.e., indicative of a vehicle in the middle of the image may be covered.

In the pixels covered by the foreign material 200, light projected from an outside may be blocked. Thus, a color, gray level and transparency may change to dark and a change rate of brightness may decrease.

It is described in detail below that the attachment of the foreign material 200 is maintained for a predetermined period of time or more and is accumulated in a plurality of image frames.

Figure 4:
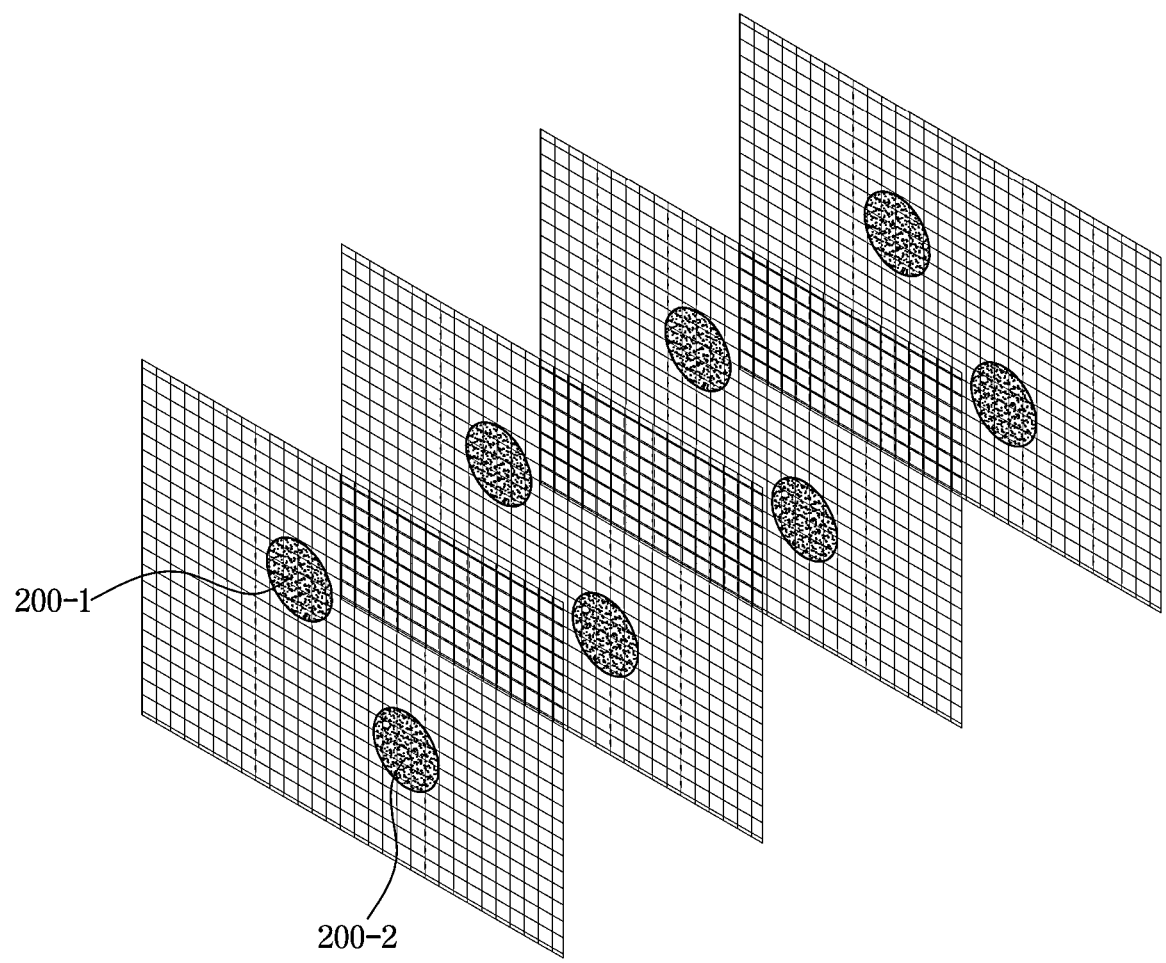
FIG. 4 is a diagram illustrating an example of foreign material detection accumulated in a plurality of frames in a vehicle according to an embodiment.

FIG. 4 is a diagram illustrating an example of detection of foreign materials 200-1 and 200-2 accumulated in a plurality of image frames in the vehicle 100 according to an embodiment. As described above, an image is photographed by the camera 140 and acquired image data may consist of a plurality of image frames.

When the foreign materials 200-1 and 200-2 are attached to a window of the vehicle 100 or the camera 140, and then detached in a short time due to an external environment like wind or a movement of the vehicle 100, a detection of the foreign materials 200-1 and 200-2 according to an embodiment may be erroneously performed.

Accordingly, by setting a determination time to determine the presence of the foreign materials 200-1 and 200-2 to a minimum time expressed in minute units, when the foreign materials 200-1 and 200-2 are repeatedly present in the plurality of image frames and a brightness change rate of pixels is determined to be low, the controller 110 may determine that the foreign materials 200-1 and 200-2 are detected.

For example, the number of samples used by the controller 140 to determine the presence of the foreign materials 200-1 and 200-2 may be 200, which indicates that the number of image frames to be analyzed for determining that the foreign materials 200-1 and 200-2 are present is 200. In this instance, the determination time of the foreign materials 200-1 and 200-2 by the controller 110 may indicate a period of time for which the 200 image frames are sampled.

When the vehicle 100 is stopped, a change rate of image may decrease sharply, and a malfunction may occur. Accordingly, the vehicle 100 may be required to be driven in order for the controller 110 to acquire a plurality of image frames.

Specifically, the controller 110 may vary a sampling time for acquiring the image frames by dividing the image of the vehicle 100 differently when the controller 110 determines that the vehicle 100 is being driven with a small rate of change in driving direction than when the controller 110 determines that the vehicle 100 is being driven with a large rate of change in driving direction.

The controller 110 may determine that the change rate in driving direction is small when a rotation angle of a steering wheel of the vehicle 100 is less than 15 degrees. In other words, when the rotation angle of the steering wheel of the vehicle 100 is less than 15 degrees, the controller 110 may determine that the vehicle is being driven along a straight line, i.e., straight driving, and may set the sampling time long because the change rate of image is small.

For example, the controller 110 may acquire 200 image frames per minute and set a sampling time to once every 3 seconds. In other words, when the controller 110 determines that the vehicle is being driven in a straight line, i.e., straight driving, because a change in image frames stored in the camera 140 is relatively small compared to curve driving, the foreign materials 200-1 and 200-2 may be effectively detected by lengthening the sampling period.

The controller 110 may determine that the change rate in the driving direction is large when the rotation angle of the steering wheel of the vehicle 100 is equal to or greater than 15 degrees. In other words, when the rotation angle of the steering wheel of the vehicle 100 is equal to or greater than 15 degrees, the controller 110 may determine that the vehicle is being driven along a curved line, i.e., curve driving, and may set the sampling time short because the change rate of the image is large.

For example, the controller 110 may acquire 240 image frames per minute and set a sampling time of four times per second. In other words, when the controller 110 determines that the vehicle is being driven along a curved line, i.e., curve driving, because a change in image frames stored in the camera 140 is relatively large compared to straight driving, the foreign materials 200-1 and 200-2 may be effectively detected by shortening the sampling period.

When a headlamp is automatically turned on by an illuminance sensor in the vehicle 100 or an overall average of pixel brightness of image frame is less than or equal to a predetermined value, the controller 110 may determine the driving of the vehicle as night driving.

When it is determined, i.e., when the controller 110 determines that the vehicle 100 is being driven at night, the controller 110 may increase the number of image frames to be sampled in order to improve a reliability of detection of the foreign materials 200-1 and 200-2.

Specifically, when it is determined, i.e., when the controller 110 determines that the vehicle 100 is being driven at night, the controller 110 may increase the number of image frames to be sampled from 200 to 300. Also, because a change rate rapidly decreases even when an environment changes at night, the controller 110 may increase the number of image frames to be sampled.

The controller 110 may set a maximum length of the sampling time even when the sampling time is varied. For example, the controller 110 may set the maximum length of the sampling time to 10 minutes, and when the sampling time is too long, a malfunction may occur in calculating a change rate. Thus, the controller 110 may set a proper time via an experiment.

Figure 5:
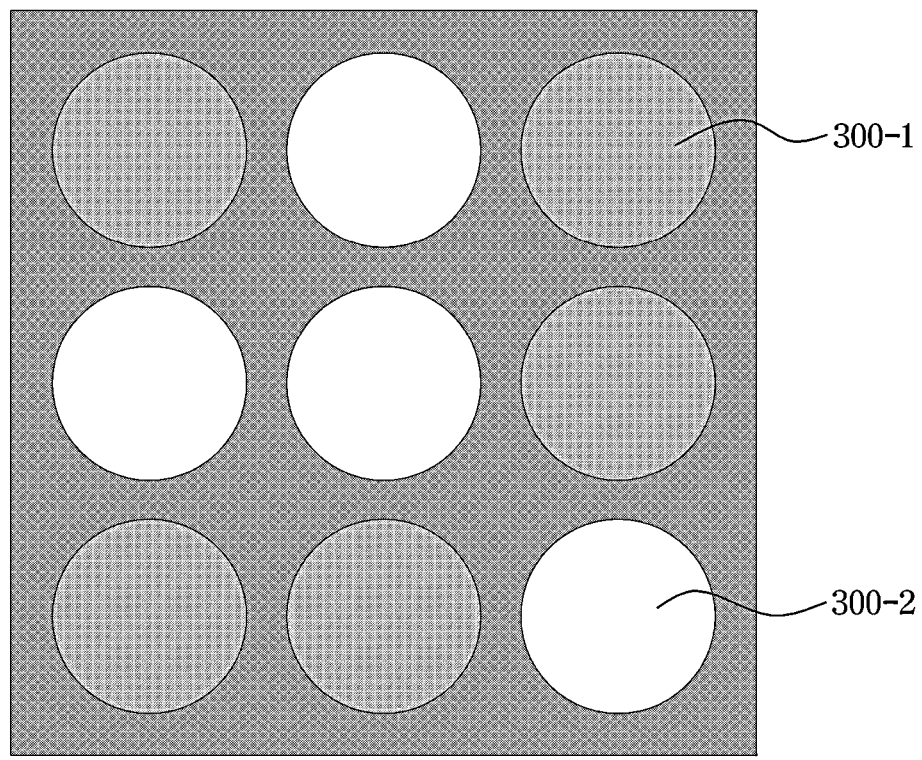
FIG. 5 is a diagram illustrating a process by which a vehicle according to an embodiment converts an image frame to grayscale.

FIG. 5 is a diagram illustrating a process by which the vehicle 100 converts an image frame to grayscale according to an embodiment.

Referring to FIG. 5, the controller 110 may convert an image frame of the vehicle 100 to grayscale to make a black-and-white image and may detect the foreign material 200 by analyzing the black-and-white image.

A grayscale image is a single sample representing only an amount of light in digital photography, computing, and colorimetric system, and carries only brightness (intensity) information. Such a grayscale image is composed of shades of gray ranging from a black color at a weakest intensity to a white color at a strongest intensity.

The image frame obtained by the controller 110 through the camera 140 has colors. A first image frame may be analyzed by dividing the first image frame into RGB values ranging from 0 to 255.

However, similar to the vehicle 100 according to an embodiment, when the controller 110 converts the image to grayscale, the amount of analysis may be reduced three times.

Specifically, because the controller 110 detects the foreign material 200 based on brightness information of pixels, when the image frame is converted into a grayscale image, only the brightness information is required to be determined from the first image frame consisting of RGB.

Accordingly, the controller 110 may analyze the image frame once without having to analyze the brightness of each RGB three times, thereby increasing an efficiency of detecting the foreign material 200.

As shown in FIG. 5, the grayscale image is composed of gray shades, and a difference in intensity may be determined with a gray pixel 300-1 of medium intensity and a white pixel 300-2 of a strongest intensity. Also, whether the foreign material 200 is present may be determined based on the difference in intensity.

Figure 6A:
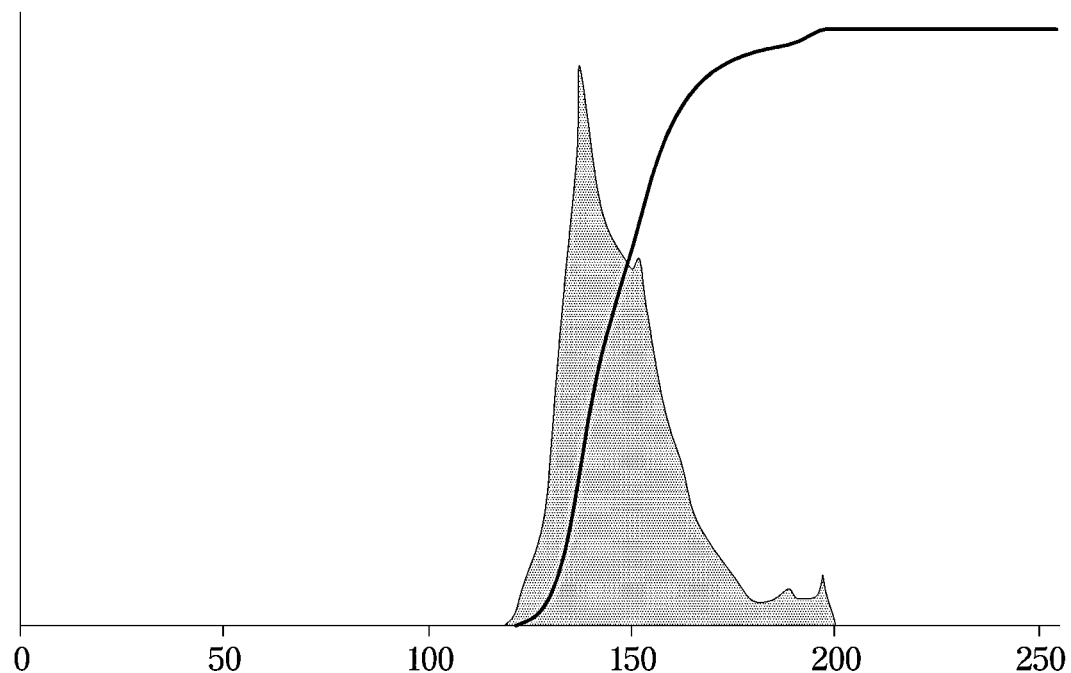
FIGS. 6A and 6B are diagrams illustrating a histogram equalization process of an image in a vehicle according to an embodiment.
Figure 6B:
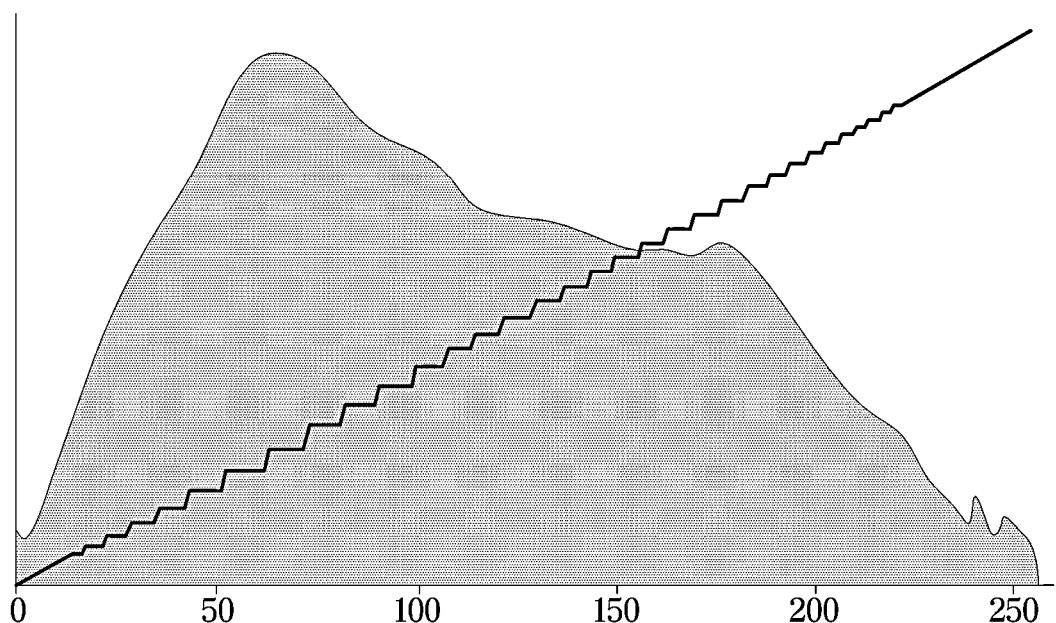

FIGS. 6A and 6B are diagrams illustrating a histogram equalization process of an image in the vehicle 100 according to an embodiment.

Referring to FIG. 6A, the controller 110 may generate a histogram by analyzing the number of pixels according to a grayscale value of an image frame. Specifically, the controller 110 may extract a grayscale value of each pixel of the image frame.

In this case, the controller 110 may calculate the number of corresponding pixels according to grayscale values from 0 to 255. The controller 110 may generate a histogram in which the number of pixels having the grayscale values from 0 to 255 are arranged in a form of a bar graph.

In this embodiment, the histogram may be a graph having a grayscale value as a horizontal axis and the number of pixels as a vertical axis. Specifically, when the camera 140 or a window of the vehicle 100 is contaminated, the pixels of the image frame may have overall grayscale values of cloudy gray or black.

In this instance, the histogram may show a sharp increase in the number of pixels at a specific grayscale value. In this embodiment, the controller 110 may generate an accumulated histogram by calculating the number of pixels accumulated as the grayscale values increase.

Referring to FIG. 6B, the controller 110 may equalize the accumulated histogram. Specifically, the controller 110 may generate an equalization histogram with an even distribution by adjusting a pixel distribution for grayscale values using the accumulated histogram.

According to an embodiment, when the controller 110 of the vehicle 100 equalizes the histogram, the foreign material 200 may be effectively detected by the controller 110 because the pixels of the image frame are prevented from having a high brightness due to high light exposure.

Also, when the controller 110 equalizes the histogram, even during night driving when a headlamp is automatically turned on by an illuminance sensor in the vehicle 100 or when an overall average of pixel brightness of an image frame is less than or equal to a predetermined value, the foreign material 200 may be effectively detected by the controller 110.

Specifically, before equalization is obtained by the controller 110, a histogram absolutely represents the number of pixels according to grayscale values. Therefore, when pixels including only high or low light exposure exist, the detection of the foreign material 200 based on comparing pixel values may be erroneously performed by the controller 110.

However, when the histogram is equalized by the controller 110, the brightness of the image frame is more even or consistent across the image frame and the pixel value distribution of the image is changed to be uniformly distributed over the entire area. Thus, the detection of the foreign material 200 by contrast may be effectively performed.

Figure 7:
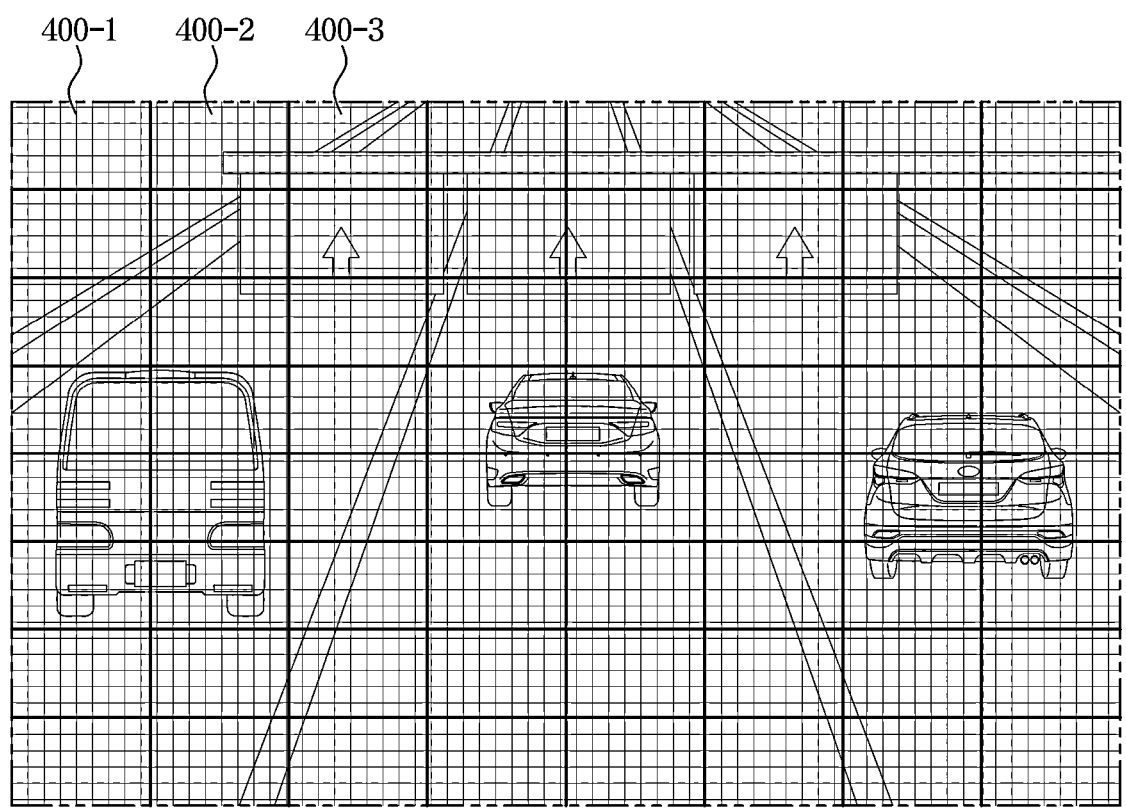
FIG. 7 is a diagram illustrating an image frame divided into 64 segments in a vehicle according to an embodiment.

FIG. 7 is a diagram illustrating an image frame divided into 64 segments including an image of the vehicle 100 according to an embodiment.

Referring to FIG. 7, the controller 110 may divide each of a plurality of image frames into 64 segments to detect the foreign material 200.

Specifically, when the controller 110 does not divide the image frames, the controller 110 may erroneously detect that the foreign material 200 is present. This malfunction of the detection mechanism may occur due to a region of the plurality of image frames having a brightness difference during sampling of the image frames.

For example, when the vehicle 100 is being driven outdoors on a clear day, the brightness of the pixels indicative of the sky may be continuously bright and the brightness of the pixels indicative of the ground may be continuously dark in the plurality of image frames.

In this case, when the controller 110 does not divide the image frames, the controller 110 may erroneously determine that the foreign material 200 is present on the ground because the brightness of pixels indicative of the ground is darker than the brightness of pixels indicative of the sky.

Accordingly, to prevent the above-described malfunction, the controller 110 may divide the image frame and perform brightness comparison for detecting the foreign material 200 within the divided segments 400-1, 400-2 and 400-3.

Dividing the image frame into 64 segments by the controller 110 is merely an example. The image frame may be divided differently depending on a national or regional state.

The controller 110 may perform brightness comparison of pixels with respect to each of the divided segments 400-1, 400-2 and 400-3. A brightness comparison performed in one segment is described below and the brightness comparison may be equally performed in all segments.

The controller 110 may obtain a brightness value for all pixels in the segment. When a brightness change rate of a single pixel is less than or equal to a reference value and is lower than an average brightness of the other pixels except for the corresponding pixel, the controller 110 may determine that the foreign material 200 is present in the corresponding pixel.

For example, in 200 sampled image frames, when a brightness change rate of at least one pixel is less than 10% and is lower than an average brightness of the other pixels except for the corresponding pixel by 33%, the controller 110 may determine that the foreign material 200 is present in the corresponding pixel.

In other words, the controller 110 may store the plurality of image frames for a predetermined period of time, divide each of the plurality of image frames into segments such as the segments 400-1, 400-2 and 400-3, and then obtain an equalized histogram to detect the foreign material 200 through brightness comparison of pixels.

In this instance, criteria for determining a brightness change rate and low brightness of pixels are merely an example and may vary depending on circumstances.

When it is determined that pixels covered by the foreign material 200 exist in an entire or a portion of the camera 140, the controller 110 may output a warning message to a user through the outputter 132. The outputter 132 may display, to the user, a warning message, or an alarm about whether sensor cleaning needs to be performed, without being limited thereto.

When the at least one pixel has a brightness lower than an average brightness of the other pixels by more than a reference range, the controller 110 may operate the sensor cleaning system 150 and output the warning message simultaneously.

Specifically, when a brightness of pixels in 200 image frames is continuously in a bottom 16%, the controller 110 may determine that a degree of contamination is serious and output the warning message and, at the same time, the controller 110 may automatically operate the sensor cleaning system 150 without a user input.

In order to prevent the controller 110 from operating the sensor cleaning system 150 more than is required so as not to interfere with driving, the controller 110 may determine that the degree of contamination is serious when the brightness of pixels is in the bottom 16% in entire sampled image frames.

In this instance, the determination that the brightness of pixels is in the bottom 16% is an example, and a percentage may be adjusted depending on circumstances.

Figure 8:
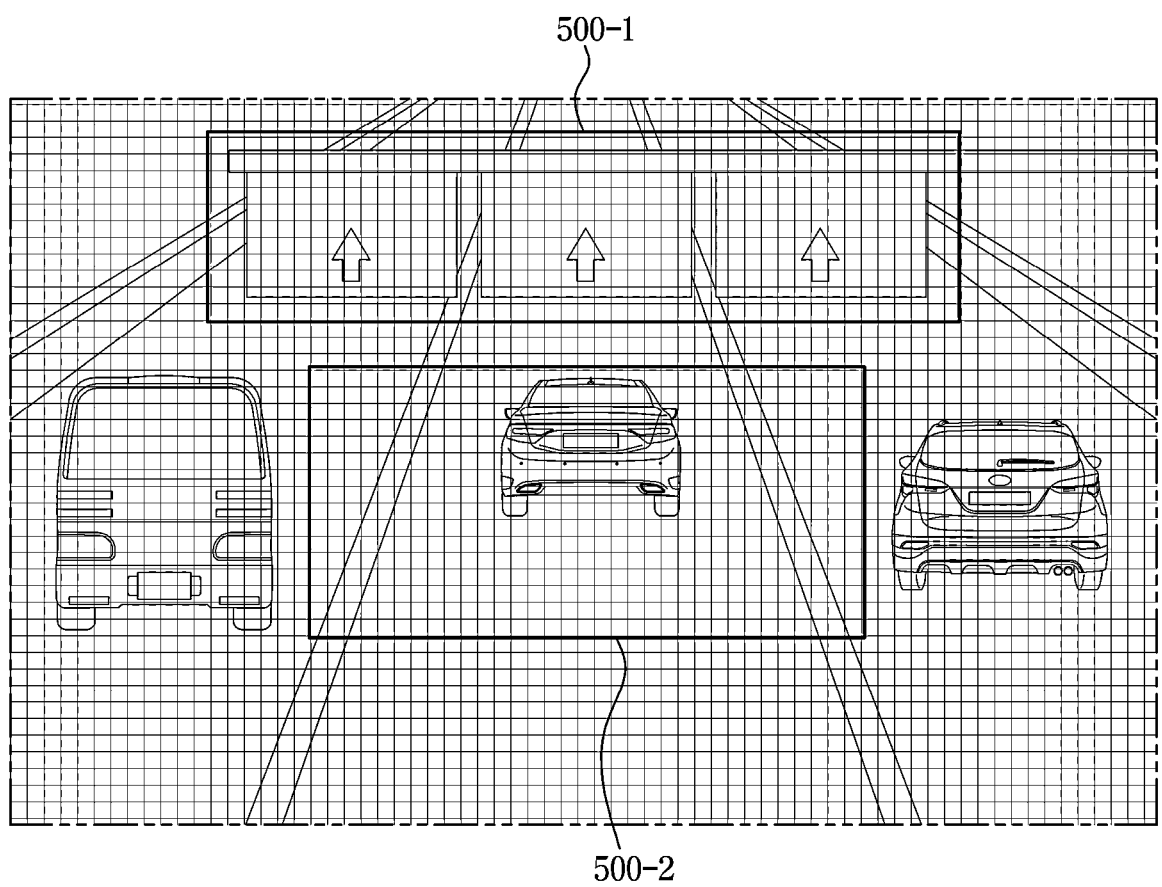
FIG. 8 is a diagram illustrating that an image acquired by a vehicle according to an embodiment is divided according to an importance of information.

FIG. 8 is a diagram illustrating that an image acquired by the vehicle 100 is divided according to an importance of information according to an embodiment.

Referring to FIG. 8, the controller 110 may increase a degree of contamination in regions 500-1 and 500-2 required for driving of the vehicle 100, such as the road sign 500-1 or the lane information 500-2.

Specifically, when information required for autonomous driving such as the road sign 500-1 or the lane information 500-2 is photographed by the camera 140, in an event of contamination of the corresponding region by the foreign material 200, driving of the vehicle 100 may be disturbed.

In this instance, the information required for driving of the vehicle 100 may include the road sign 500-1, the lane information 500-2, as well as all kinds of information required for driving such as information about another vehicle, obstacles, road surface, and the like.

In order to increase the degree of contamination in the regions 500-1 and 500-2 required for driving of the vehicle 100, the controller 110 may increase a brightness standard for determining a serious contamination state. Also, when a contamination rate compared to all pixels is equal to or greater than a predetermined reference value, the controller 110 may warn a user. With respect to the regions 500-1 and 500-2 required for driving of the vehicle 100, the controller 110 may warn the user early by decreasing a standard of the contamination rate.

For example, with respect to the regions 500-1 and 500-2 required for driving of the vehicle 100, the controller 110 may warn the user when 15% of the total pixels are contaminated. With respect to the other regions, however, the controller 110 may warn the user when 20% of the total pixels are contaminated.

Figure 9:
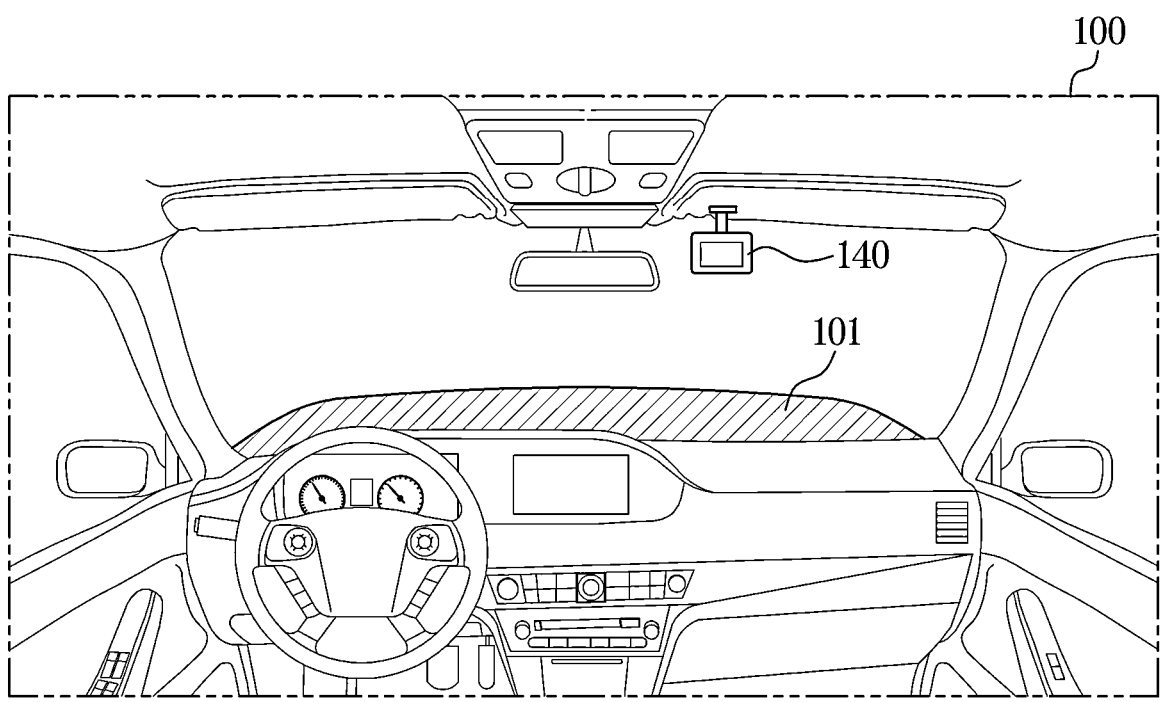
FIG. 9 is a diagram illustrating that a vehicle, according to an embodiment, excludes a portion corresponding to a constituent component of the vehicle from a foreign material detection.

FIG. 9 is a diagram illustrating that the vehicle 100 excludes a portion corresponding to a constituent component of the vehicle 100 from a foreign material detection.

Referring to FIG. 9, when a bonnet, which is a constituent component 101 of the vehicle 100, is photographed by the camera 140, the controller 110 may exclude the constituent component 101 from detection of the foreign material 200 according to an embodiment.

Because the camera 140 photographs an area around the vehicle 100, the constituent components 101 of the vehicle 100 such as the bonnet, side mirrors, bumper, and the like, may be included in an image frame.

In this instance, when pixels corresponding to the constituent components 101 of the vehicle 100 are included in a process of detecting the foreign material 200, a non-foreign material may be erroneously determined as the foreign material 200.

Specifically, because pixels corresponding to the bonnet of the vehicle 100 are a result of photographing a same part at all times, a brightness change rate may be very low. Accordingly, when the vehicle 100 is a black vehicle, the controller 110 may erroneously determine the bonnet as the foreign material 200 because a brightness change rate of the bonnet is low and is lower than an average brightness of other pixels.

Thus, the controller 110 of the vehicle 100, according to an embodiment. may exclude the constituent components 101 of the vehicle 100 from detection of the foreign material 200, and thereby may reduce a probability of false detection.

Figure 10:
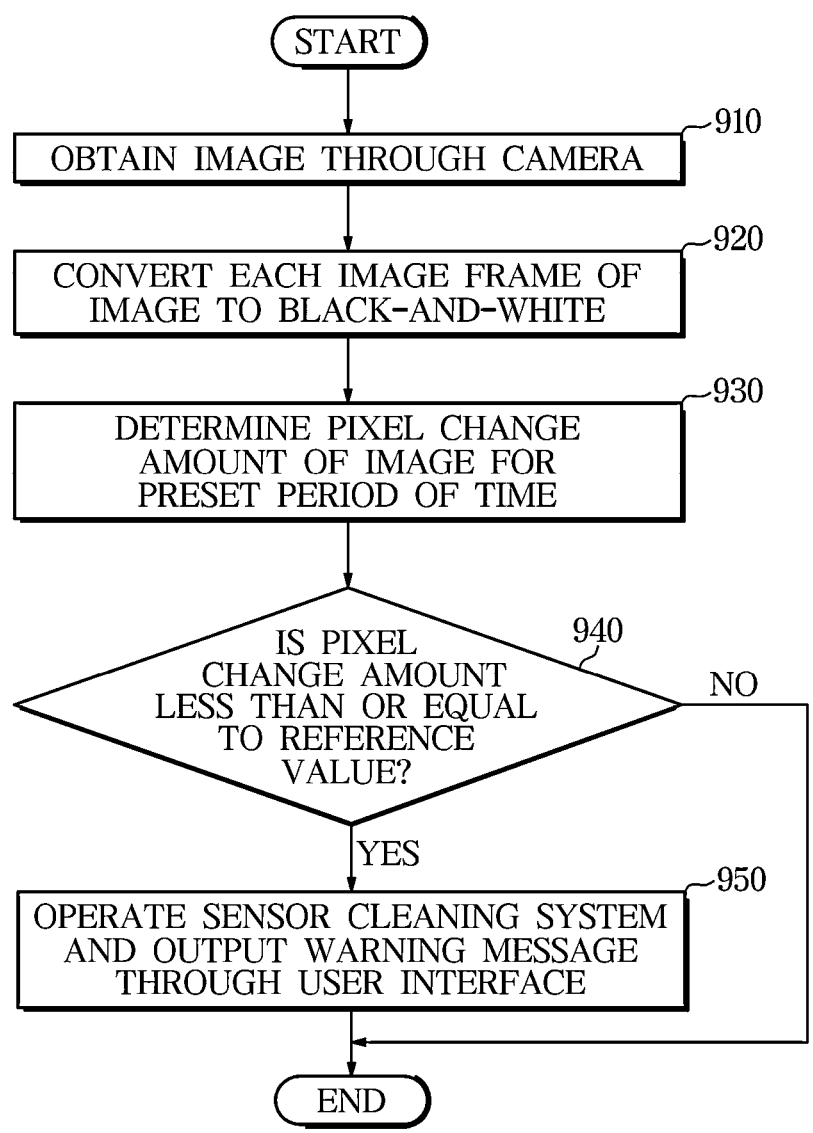
FIG. 10 is a flowchart illustrating a control method of a vehicle according to an embodiment.

FIG. 10 is a flowchart illustrating a control method of the vehicle 100 according to an embodiment.

Referring to FIG. 10, the controller 110 may obtain a plurality of image frames through the camera 140 of the vehicle 100 according to an embodiment (910).

Afterwards, the controller 110 may convert the plurality of image frames to black-and-white and equalize a histogram with respect to grayscale to detect the foreign material 200 (920).

The controller 110 may divide the image frame into segments, obtain a brightness value for all pixels within each of the segments for a preset sampling time, and determine a brightness change rate of a single pixel (930). In this instance, when the brightness change rate of the single pixel is less than or equal to a reference value and is lower than an average brightness of the other pixels, except for the corresponding pixel, the controller 110 may determine that the foreign material 200 is present in the corresponding pixel (940).

When a presence of the foreign material 200 is determined, the controller 110 may output a warning message depending on a degree of contamination through the user interface 130, or automatically operate the sensor cleaning system 150 together with the output of the warning message (950).

Figure 11:
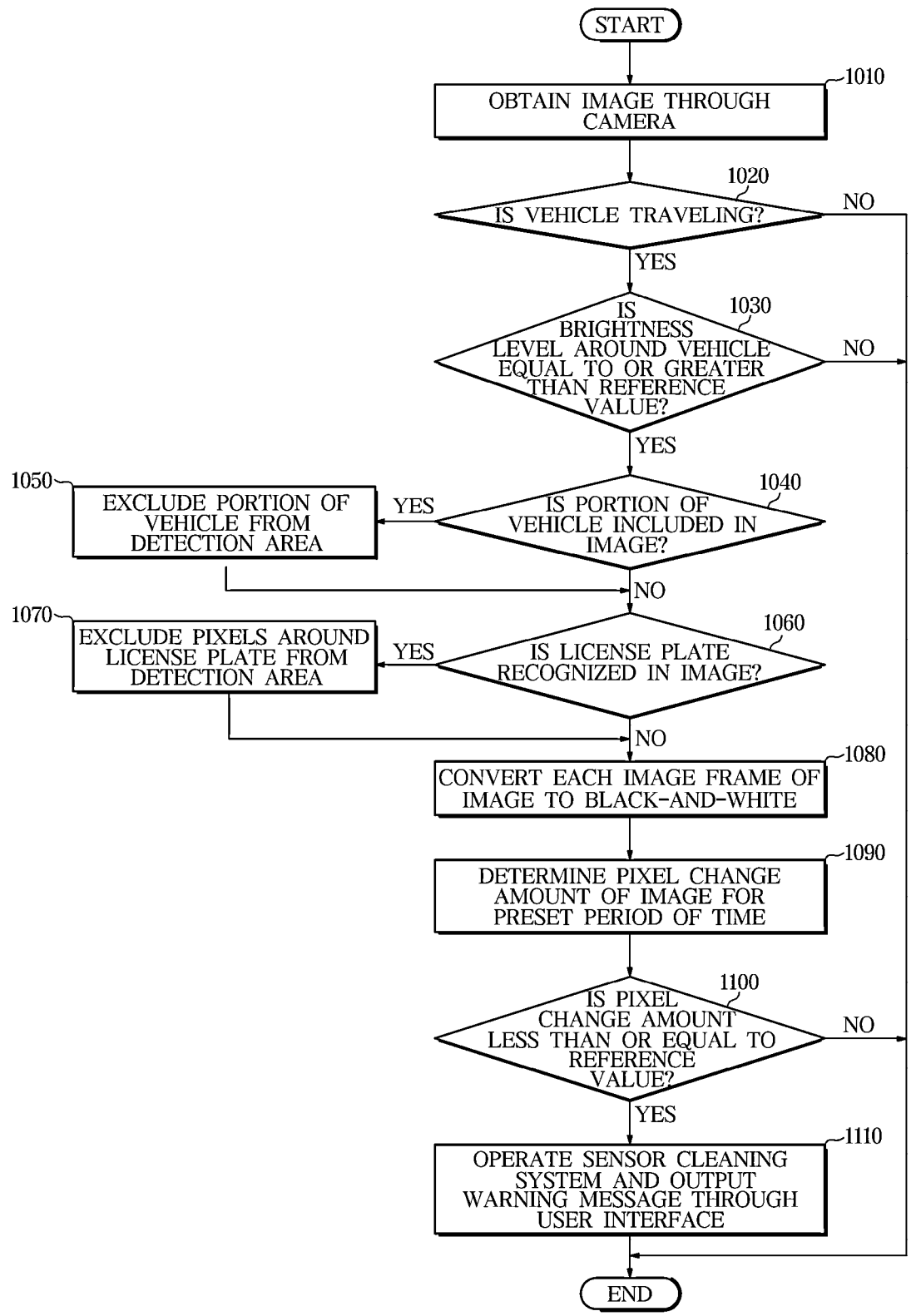
FIG. 11 is a flowchart illustrating a control method of a vehicle according to an embodiment in an exceptional situation.

FIG. 11 is a flowchart illustrating a control method of the vehicle 100 in an exceptional situation according to an embodiment.

According to an embodiment, the vehicle 100 may obtain an image frame through the camera 140 (1010), and perform a foreign material detection, only when the vehicle 100 is driving, in order to prevent a malfunction caused by a rapid decrease in a change rate of image when the vehicle 100 is stopped (1020).

Also, when a brightness around the vehicle 100 is too dark to detect the foreign material 200, detecting the foreign material 200 may be stopped because a driver is incapable of driving the vehicle 100 (1030).

As described with reference to FIG. 9, the controller 110 may determine whether a portion of the vehicle 100 is included in the image frame obtained by the camera 140 (1040). When the controller 110 determines that the portion of the vehicle 100 is included, the controller 110 may exclude the portion of the vehicle 100 from a detection area of the foreign material 200 (1050).

Also, because a periphery of a license plate of another vehicle is a part of the other vehicle, a brightness change rate of pixels is low, which may lead to a false detection.

Accordingly, the controller 110 may determine whether the license plate of the other vehicle is recognized in the image frame (1060) and may exclude pixels around the license plate from detection of the foreign material 200 (1070).

Afterwards, the controller 110 may convert a plurality of image frames to black-and-white and equalize a histogram with respect to grayscale to detect the foreign material 200 (1080).

The controller 110 may divide the image frame into segments, obtain a brightness value for all pixels within the each of the segments for a preset sampling time, and determine a brightness change rate of a single pixel (1090). In this instance, when the brightness change rate of the single pixel is less than or equal to a reference value and is lower than an average brightness of the other pixels except for the corresponding pixel, the controller 110 may determine that the foreign material 200 is present in the corresponding pixel (1100).

When a presence of the foreign material 200 is determined, the controller 110 may output a warning message depending on a degree of contamination through the user interface 130, or automatically operate the sensor cleaning system 150 together with the output of the warning message (1110).

Since detailed embodiments of the control method of the vehicle 100 are similar as the above-described embodiments of the vehicle 100, a description thereof has been omitted.

As should be apparent from the above, according to various embodiments of the disclosure, the vehicle and the control method thereof can detect contamination attached to the outside of a vehicle by using a service provided through camera information. Therefore, the vehicle and the control method thereof reduce a probability of information distortion, and thereby can stably operate various functions using the information without errors.

Also, a sensor using radio waves can detect an immediate signal abnormality caused by a foreign material, determine the abnormality, and thereby can automatically operate a sensor cleaning system.

Although embodiments have been described for illustrative purposes, those of ordinary skill in the art should appreciate that various modifications, additions, and substitutions are possible, without departing from the scope and spirit of the disclosure. It is therefore intended that the foregoing detailed description be regarded as illustrative rather than limiting.

What is claimed is:

1. A vehicle comprising:
at least one camera configured to photograph an image around the vehicle;
a memory configured to store image data input from the at least one camera; and
a controller configured to determine that a foreign material is present on the at least one camera and to output a warning message to a user when a brightness change rate of at least one pixel among each pixel of an image frame included in the image data is less than or equal to a reference value and is lower than an average brightness of other pixels except for the at least one pixel,
wherein, to determine that the foreign material is present, the controller is further configured to divide the image frame into preset segments and to compare the average brightness of the other pixels with a brightness of the at least one pixel for each segment.

2. The vehicle of claim 1, wherein the controller is configured to obtain a histogram of a brightness of each of the pixels, equalize the histogram, and compare the average brightness of the other pixels with a brightness of the at least one pixel.

3. The vehicle of claim 1, wherein the controller is configured to increase a length of the image data input from the at least one camera to increase a number of image frames to be sampled when a steering angle of the vehicle is less than a reference value.

4. The vehicle of claim 1, wherein the controller is configured to increase a length of the image data input from the at least one camera to increase a number of image frames to be sampled when an illuminance detected by an illuminance sensor of the vehicle is less than a reference value.

5. The vehicle of claim 1, wherein the controller is configured to increase a degree of contamination by the foreign material with respect to a region including information for driving of the vehicle in the image photographed by the at least one camera.

6. The vehicle of claim 1, wherein, when a part of the vehicle is included in the image photographed by the at least one camera, the controller is configured to stop a foreign material detection with respect to pixels corresponding to the part of the vehicle.

7. The vehicle of claim 1, wherein, when a license plate of another vehicle traveling on a road is recognized in the image photographed by the at least one camera, the controller is configured to stop a foreign material detection with respect to pixels adjacent to pixels recognized as the license plate.

8. The vehicle of claim 1, wherein the controller is configured to output the warning message and to operate a sensor cleaning system simultaneously when a brightness of the at least one pixel is lower than the average brightness of the other pixels by more than a reference range.

9. A control method of a vehicle, the control method comprising:
    photographing, by a camera, an image around the vehicle;
    storing, by a controller, image data input from the camera in a memory;
    detecting, by the controller, a brightness change rate of each pixel of an image frame included in the image data;
    determining, by the controller, that a foreign material is present on the camera when a brightness change rate of at least one pixel among each of the pixels is less than or equal to a reference value and is lower than an average brightness of other pixels except for the at least one pixel; and
    outputting, by the controller, a warning message to a user based on a determination that the foreign material is present,
    wherein determining that the foreign material is present further comprises
    dividing, by the controller, the image frame into preset segments, and
    comparing, by the controller, the average brightness of the other pixels with a brightness of the at least one pixel for each segment.

10. The control method of claim 9, wherein the determining that the foreign material is present further comprises:
    obtaining, by the controller, a histogram of a brightness of each of the pixels, equalizing the histogram, and comparing the average brightness of the other pixels with a brightness of the at least one pixel.

11. The control method of claim 9, wherein the storing of the image data input from the camera increases a length of the image data input from the camera to increase a number of image frames to be sampled when a steering angle of the vehicle is less than a reference value.

12. The control method of claim 9, wherein the storing of the image data input from the camera increases a length of the image data input from the camera to increase a number of image frames to be sampled when an illuminance detected by an illuminance sensor of the vehicle is less than a reference value.

13. The control method of claim 9, wherein the detecting of the brightness change rate of each of the pixels of the image frame further comprises:
    Increasing, by the controller, a degree of contamination by the foreign material with respect to a region including information for driving of the vehicle in the image photographed by the camera.

14. The control method of claim 9, wherein the determining that the foreign material is present further comprises:
    when a part of the vehicle is included in the image photographed by the camera, stopping, by the controller, a foreign material detection with respect to pixels corresponding to the part of the vehicle.

15. The control method of claim 9, wherein the determining that the foreign material is present further comprises:
    when a license plate of another vehicle traveling on a road is recognized by the controller in the image photographed by the camera, stopping, by the controller, a foreign material detection with respect to pixels adjacent to pixels recognized as the license plate.

16. The control method of claim 9, wherein the outputting of the warning message to the user further comprises:
    outputting, by the controller, the warning message and operating a sensor cleaning system simultaneously, when a brightness of the at least one pixel is lower than the average brightness of the other pixels by more than a reference range.

* * * * *